United States Patent Office 3,481,991
Patented Dec. 2, 1969

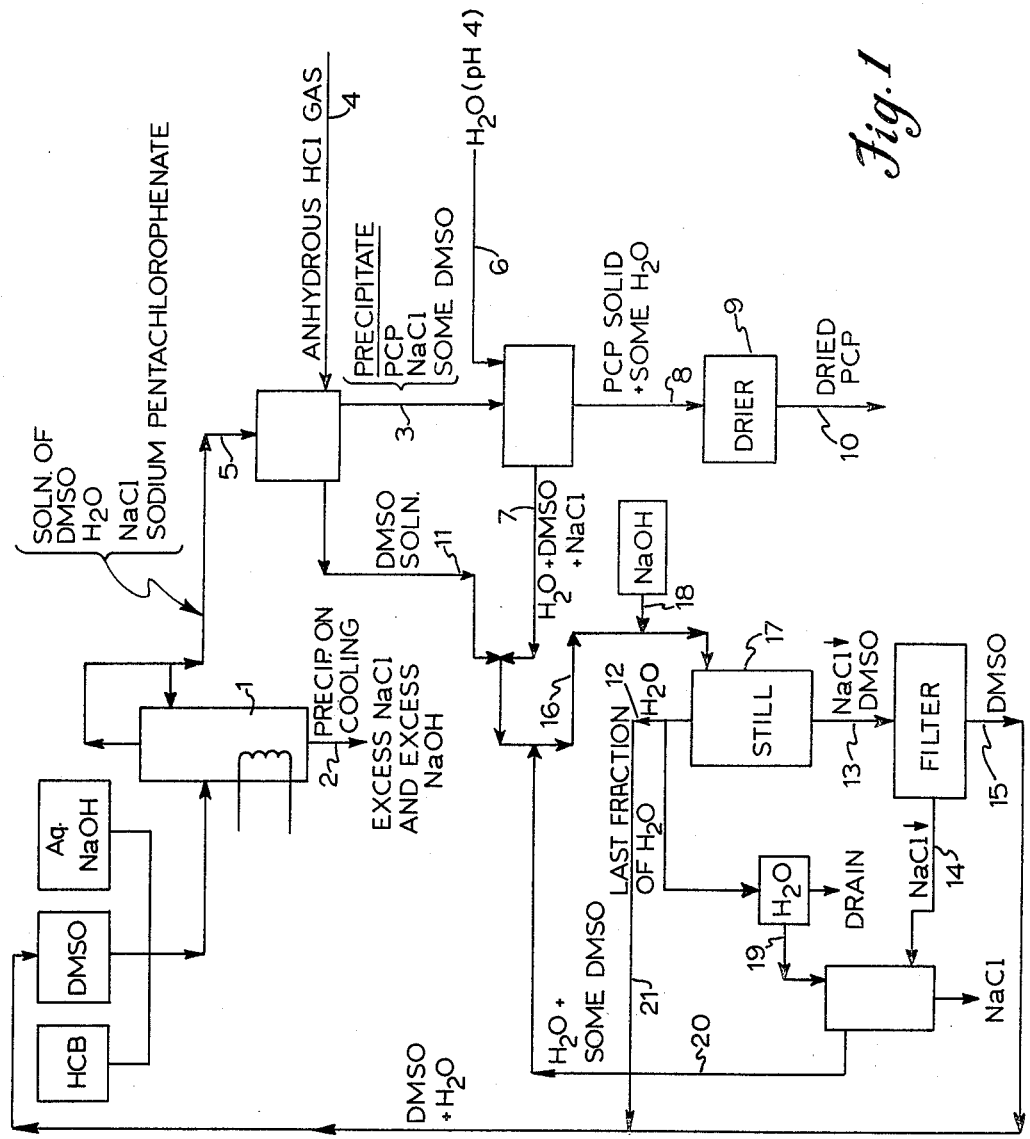

3,481,991
PREPARATION OF CHLORINATED
HYDROXY COMPOUNDS
Robert Seldon Cohen, Dover, Ohio, assignor to Dover
  Chemical Corporation, Dover, Ohio, a corporation of
  Ohio
Filed June 3, 1963, Ser. No. 284,991
Int. Cl. C07c 39/36, 37/02
U.S. Cl. 260—623                                  9 Claims This invention relates to the preparation of chlorinated hydroxy compounds and, more particularly, to the preparation of such compounds by a novel hydrolysis technique. While, as will appear hereinafter, this application is not restricted to the preparation of pentachlorophenol, one of the prime areas of applicability of the process of the present invention is to the hydrolysis of hexachlorobenzene to form pentachlorophenol.

Pentachlorophenol is a particularly valuable compound for use in the insecticidal, fungicidal, pesticidal and bactericidal field. It is particularly useful in combatting insects such as the beetle or louse and fungi like those which cause leather mold, as well as to preserve wood, textiles and similar materials.

Pentachlorophenol is generally prepared in practice by one of two methods: through the chlorination of phenol or chlorophenols or through the hydrolysis of hexachlorobenzene. The former method suffers from the significant disadvantage of being quite costly. As a result of this fact, many attempts have been made to perfect hydrolysis techniques in an effort to provide industry with a commercially practicable process.

In general, the hydrolysis technique which has been heretofore employed involves the reaction of hexachlorobenzene with an excess of a suitable hydroxide (i.e., such as an alkali metal hydroxide) in a suitable reaction medium to form the pentachlorophenate and the subsequent acidification of the reaction product to form the pentachlorophenol. Various reaction media have been suggested for the carrying out of the process, including the simple aliphatic alcohols, diols, triols, etc. Regardless of which reaction media have been utilized, however, the hydrolysis processes of the prior art have not been without their attendant difficulties.

For example, when either methyl or ethyl alcohol are used as the reaction medium, objectionable by-products are usually formed which increase separation problems in obtaining the final product. In addition, considerable quantities of the alcohol are ordinarily consumed in the formation of ethers and similar compounds and it is, accordingly, necessary to replace the alcohol so consumed to maintain a continuous process. These and other prior art hydrolysis processes have also definitely been limited from the standpoint of purity and yield of product obtained. For example, pure pentachlorophenol has a melting point of about 191° C. and purchasers of this chemical have come to demand a product having a setting point of at least about 175° C. and preferably 178° C. or above. Prior art processes have, by and large, been incapable of obtaining pentachlorophenol of such purity except at prohibitive cost.

In accordance with the present invention, a novel method applicable to the hydrolysis of chlorinated compounds to form their corresponding phenols or hydroxy compounds has now been developed which eliminates most if not all of the difficulties associated with prior art hydrolysis techniques, which produces a product in extremely high and pure yield at a cost significantly lower than that involved in currently known techniques and which requires no complex equipment or expensive physical plant to be carried out effectively.

It is accordingly a primary object of the present invention to provide a novel and improved method of hydrolyzing chlorinated compounds to form their corresponding phenols or hydroxy compounds.

It is another principal object of the present invention to provide a novel and improved process of hydrolyzing chlorinated compounds to form their corresponding phenols or hydroxy compounds which process produces such compounds in high yield and with extremely high purity at a cost significantly lower than that involved in the carrying out of presently known processes.

It is still another important object of the present invention to provide a novel process for converting polychlorinated compounds to form their corresponding chlorinated hydroxy compounds which process involves the alkaline hydrolysis of said polychlorinated compounds in the presence of unique and extremely effective reaction media.

It is a further object of the present invention to provide a novel process for hydrolyzing chlorinated compounds to form their corresponding hydroxy compounds in the presence of a reaction medium selected from the group consisting of (1) alkyl sulfoxides having the structure

wherein R is an alkyl group having 1 to 4 carbon atoms; (2) heterocyclic sulfoxides having the structural formula

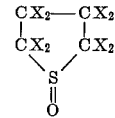

wherein X is a member of the group consisting of H and a lower alkyl group, not more than two X's being an alkyl group and the remainder being H; and (3) heterocyclic sulfoxides having the structural formula

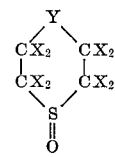

wherein Y is a member of the group consisting of S=O and $CX_2$ wherein X has the meaning hereinbefore given and not more than two X's are an alkyl group and the remainder are H.

It is another significant object of the present invention to provide a novel process for hydrolyzing chlorinated compounds to form their corresponding hydroxy compounds in the presence of dimethylsulfoxide as the reaction medium.

It is a further object of the present invention to provide a novel and improved process of hydrolyzing chlorinated compounds, such as chlorinated benzenes or chlorinated paraffins, by means of an alkaline hydrolyzing agent in the presence of dimethylsulfoxide as the reaction medium.

It is another important object of the present invention to provide a novel and improved process of hydrolyzing chlorinated compounds to form their corresponding hydroxy compounds, at least one of the steps of which comprises reacting said chlorinated compound with a hydrolyzing agent to form the single salt of said chlorinated compound and said hydrolyzing agent, the improvement comprising carrying out said one step in a reaction medium in which the hydrolyzing agent is at least partially solubilizable, in which the chlorinated compound is at least partially soluble, from which said corresponding hydroxy compound is separable, which will not decompose at the temperature at which said one step is carried out, which is substantially non-reactive with the reactants and reaction products of said hydrolyzing process, the salt of said chlorinated compound being soluble in the solution comprising said reaction medium and the reaction products of said one step.

It is another principal object of the present invention to provide an improved and novel process of hydrolyzing hexachlorobenzene to pentachlorophenol involving the reaction of the hexachlorobenzene with an alkaline hydrolyzing agent in the presence of a reaction medium in which the hydrolyzing agent is at least partially soluble or can be made partially soluble therein, in which the hexachlorobenzene is at least partially soluble, in which the intermediate chlorophenate which is formed during the reaction is soluble, which will not decompose at the temperature of the hydrolysis reaction, which is separable from the pentachlorophenol which is formed, which is separable from water and which is non-reactive with the reactants and reaction products of the reaction.

It is another important object of the present invention to provide a novel and improved process of hydrolyzing alkaline hydrolysis of hexachlorobenzene in the presence of a dimethylsulfoxide reaction medium.

It is another important object of the present invention to provide a process of separating dimethylsulfoxide, water and sodium chloride from one another in a solution in which they are present comprising the steps of removing a sufficient quantity of the water from said dimethylsulfoxide and sodium chloride to cause said chloride to crystallize from said dimethylsulfoxide and removing sodium chloride crystals thus formed from said dimethylsulfoxide.

These and other important objects and advantages of the present invention will become more apparent from the ensuing description, appended claims and the single drawing, which drawing sets forth a flow diagram of a specific embodiment of the process of the present invention.

In its broadest respect, the present invention involves the hydrolysis of chlorinated compounds to form their corresponding hydroxy compounds, the broad essence of the invention residing in the carrying out of such hydrolysis in a unique reaction medium having certain specified characteristics. More specifically, the characteristics of the reaction medium which make the present invention significant are the following:

(a) The hydrolyzing agent is at least partially soluble or can be made partially soluble in the reaction medium, the latter preferably being effected by using the aqueous form of said hydrolyzing agent;

(b) The chlorinated compound starting material is at least partially soluble therein;

(c) The intermediate salt formed by the reaction of the chlorinated compound with the hydrolyzing agent is soluble in the solution comprising said reaction medium and the reaction products of the hydrolysis;

(d) Said reaction medium will not decompose at the temperature at which the process is carried out;

(e) The resulting hydroxy compound is separable therefrom, preferably being insoluble therein; and (f) Said reaction medium is substantially non-reactive with the reactants and reaction products of the hydrolyzing process.

Preferably, such reaction medium also has the following additional characteristics:

(g) Water is separable therefrom, preferably by distillation;

(h) The chloride formed through the reaction of the chlorinated pound and the hydrolyzing agent is insoluble in said reaction medium; and (i) A mixture of said reaction medium, the hydrolyzing agent and the chlorinated compound should boil at atmospheric pressure at least at the temperature at which said hydrolysis is carried out.

Reaction media which possess the above-identified characteristics are certain sulfoxide compounds, said compounds falling in three general categories:

(1) Alkyl sulfoxides having the structural formula:

wherein R is alkyl group having 1 to 4 carbon atoms;

(2) Heterocyclic sulfoxides having the structural formula:

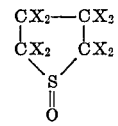

wherein X is a member of the group consisting of H and a lower alkyl group, not more than two X's being an alkyl group and the remainder being H; and (3) Heterocyclic sulfoxides having the structural formula:

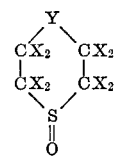

wherein Y is a member of the group consisting of S=O and $CX_2$ wherein X has the meaning hereinbefore given and not more than two X's are an alkyl group and the remainder are H.

Of the foregoing sulfoxides, the most effective in the practice of the present invention are those in group (1). Of the latter, a reaction medium which is not only extremely effective in the carrying out of the hydrolysis reaction in question but which is extraordinary in its effectiveness is dimethylsulfoxide, which will hereinafter be abbreviated by the term "DMSO" and which may be represented by the following formula: $(CH_3)_2S=O$. This particular reaction medium has a high solubility both for aqueous caustic and chlorinated benzenes, is substantially completely inert to the reactants and the reaction products involved in the hydrolysis reaction in question, will permit the carrying out of the hydrolysis reaction in conventional equipment at moderate temperatures and substantially atmospheric pressure, will result in yields as high as 96.5% or higher and products having a purity as high as 99.8% or even higher, yet will permit a reduction in cost of production of significant proportions.

While not specifically so limited, the advantages of the unique reaction media of the present invention are obtained to a significant degree in the alkaline hydrolysis of chlorine substituted benzenes and chlorinated paraffins to their corresponding hydroxy-substituted derivatives. These starting materials may be utilized in varying degrees of chlorine substitution, depending on the ease of hydrolyzability of the particular compound, it being found generally that the more highly substituted compounds are most readily hydrolyzable. Merely by way of example, chlorinated paraffins are generally commercially available with a chlorine content of about 20–80% chlorine, with chlorinated paraffins having about 10 or less carbon atoms being most preferred in the process of the present invention. The preferred starting material for the process of the present invention is hexachlorobenzene.

Generally speaking, the process of the present invention takes place in two stages. In the first stage, the chlorinated material is reacted with an excess of an alkaline hydrolyzing agent to form as a principal reaction product the mono salt of the hydrolyzing agent with the chlorinated compound. For example, as will be discussed in greater detail hereinbelow, the reaction of hexachlorobenzene with an excess of sodium hydroxide will cause the formation of sodium pentachlorophenate. The solution containing the phenate is then acidified to convert the phenate to the corresponding phenol, following which the reaction medium is recovered for reuse in the process.

The process of the present invention will best be understood by reference to a specific embodiment in which hexachlorobenzene is hydrolyzed to form pentachlorophenol, the process being carried out in the presence of DMSO as the reaction medium. This description will be best followed by reference to the single drawing which illustrates a flow sheet of the process of the specific embodiment in question. During the course of the ensuing description, numbers in parentheses will be set forth to indicate the point on the flow diagram corresponding to the particular discussion in question.

The following process description may be divided into four stages. The first stage involves the hydrolysis of the hexachlorobenzene to sodium pentachlorophenate, the second stage of the process involves the acidification of the reaction solution to form pentachlorophenol, the third stage involves the washing and recovery of the pentachlorophenol and the fourth stage describes the recovery of the DMSO to prepare it for reuse in the continuous process.

STAGE I.—HYDROLYSIS

Reactants

| Compound | Grams | Ratio of Moles |
|---|---|---|
| Hexachlorobenzene | 50.0 | 1.0 |
| DMSO | 200.0 | 14.6 |
| Water | 20.6 | 6.5 |
| Sodium hydroxide | 20.6 | 2.9 |

REACTION I

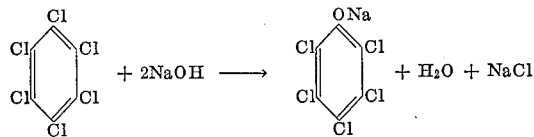

The hydrolysis of hexachlorobenzene to the sodium salt of pentachlorophenol is carried out by the action of sodium hydroxide and water upon hexachlorobenzene in DMSO. The DMSO serves only as the reaction medium and is not itself altered in any way except that it will tend to dissolve and hold impurities originally present in the hexachlorobenzene.

The hexachlorobenzene and DMSO are placed in a round bottom flask 1 equipped with a thermometer, heater and reflux condenser. The hexachlorobenzene is largely insoluble in the DMSO and the mixture is, accordingly, a slurry. When this slurry has been heated to about 100° C., the solution of sodium hydroxide in water is added, the temperature of the mixture raised to the boiling point and the mixture refluxed until the reaction is complete. The initial heating of the slurry to 100° C. is not critical although the slurry should not be heated to the boiling point of the mixture before the reaction starts or an unduly large amount of impurities will be formed. If the indicated amount of water is used the mixture will boil at approximately 155° C. and the reaction should be complete in approximately three hours. While the hydrolysis will take place in the presence of larger amounts of water, the boiling temperature will be lowered by such addition and the reaction time lengthened. It is to be noted that where the reaction is carried out in a small flask, stirring is not absolutely necessary since the boiling action will keep the slurry agitated.

The sodium pentachlorophenate is soluble in the water-DMSO solution and, as a result, the reaction will be observed to be complete when the DMSO solution is clear and there are no longer any hexachlorobenzene crystals visible on the top of the flask or in the DMSO. Upon cooling the reactants after the reaction is complete, however, some excess salt and excess caustic will solidify (2) on the bottom of the flask.

STAGE II.—PRECIPITATION OF PENTACHLOROPHENOL

Reactants

| Compound | Grams | Ratio of Moles |
|---|---|---|
| Solution of the sodium salt of pentachlorophenol in DMSO from Stage I | 291.2 | |
| Anhydrous hydrogen chloride gas | 13.8 | 2.0 |

REACTION II

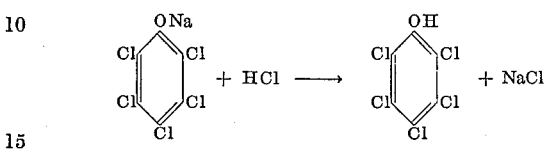

The precipitation (3) of pentachlorophenol is effected by bubbling anhydrous hydrogen chloride gas 4 through the solution from Stage I (5) until the excess caustic has been neutralized, the sodium salt converted to the phenol and the pH of the solution lowered to at least 4. This reaction was effected at room temperature.

The pentachlorophenol will precipitate as a white to tan colored solid, which can easily be filtered out in a Buchner funnel with filter paper, using suction. However, the pentachlorophenol will contain salt and a small amount of DMSO (3) and these must be removed to obtain pentachlorophenol of the desired purity.

STAGE III.—WASHING AND RECOVERING THE PENTACHLOROPHENOL

Materials

Pentachlorophenol with sodium chloride and DMSO from Stage II.

Approximately 600 ml. of water containing enough hydrogen chloride to lower the pH to 4.

The sodium chloride and DMSO mingled with the pentachlorophenol can be removed by water washing since the former two are soluble in water while the pentachlorophenol is insoluble in water. In making this separation, however, it is essential that the wash water be kept acid (i.e., to a pH of approximately 4) or it will be extremely difficult to filter it from the pentachlorophenol, the mixture tending to become pasty when neutral or alkaline.

The wash water 6 is added in four separate portions, each portion of about 150 ml. being mixed with the pentachlorophenol 3 and then filtered off (7). The wet pentachlorophenol 8 is then dried (9) at 100° C. for one hour to remove the water which could not be removed with filtering under suction. This amounts to about 68 grams of water on a pentachlorophenol yield (10) of 45 grams.

Based on the results of four different runs, the average pure pentachlorophenol yield was 96% of theoretical and the average purity was 97%, as determined by titration with sodium hydroxide. The average melting point was 179° C. The maximum yield was 96.5%, the maximum purity 99.8% and the maximum melting point 187° C. This latter material was almost pure white, whereas the other products ranged in color from dark to light tan.

STAGE IV.—RECOVERY OF DMSO

Materials

DMSO and impurities filtered from pentachlorophenol in Stage II.
Water washings from Stage III.
Sodium hydroxide to adjust pH to about 8.

After combining the DMSO (11) and water washings 7, the DMSO can be almost completely recovered by fractionally distilling off the water 12, causing the salt to crystallize out of the DMSO in which it is insoluble (13), and then filtering the solid salt 14 out of the liquid DMSO (15). The DMSO will retain a small amount of impurities from the hexachlorobenzene but this will not interfere with further hydrolyses using such DMSO as the reaction medium.

In a single recovery run which was conducted, the feed 16 into the still 17 was adjusted to a pH of 8 through addition of sodium hydroxide 18 since the DMSO will decompose if the solution is boiled in an acid condition. Starting with 754 grams, 518 grams of water were distilled over at temperatures of 100 to 108° C. at the top of a 12″ Vigreaux column and 100 to 167° C. in the boiling flask. As estimated by refractive index determinations, this water contained 2.6 grams of DMSO. After cooling, the salt 14 was easily filtered out of the DMSO, leaving 190.0 grams DMSO (15), which was 99–100% pure by refractive index determination. This DMSO can be used in another hydrolysis cycle, as shown in the drawing.

In order to determine the amount of DMSO left on the salt, the wet salt was dried at 100° C. for one hour and found to have lost 7.8 grams DMSO. The salt plus impurities weighed 39 grams and had a light pink-tan color. A total of 199.6 grams of DMSO, or 99.8%, was thus accounted for. The other 0.2% was probably lost in transferring materials or in experimental error.

Actually, only 95% of the DMSO was available for reuse with the above procedure. However, the use of a more efficient column should eliminate the loss of DMSO with water, and the DMSO left on the salt could be removed by washing the salt with a quick aqueous wash 19 composed of condensed distillate from still 17 to reduce the loss of any DMSO carried overhead in still vapors and returning the effluent wash 20 to the still 17. The last fraction of water 21 that comes off the top of the still has a bit of DMSO in it, and this is combined with the bulk of DMSO (15), not only to provide more complete DMSO recovery but to do so at no added expense, since some water must be added in Stage I in any event to provide mutual solubility of reactants.

A summary of the above procedure is set forth in Table I:

TABLE I

|  | Grams | Ratio of Moles |
|---|---|---|
| Reactants and Materials: |  |  |
| Hexachlorobenzene | 50.0 | 1.0 |
| DMSO | 200.0 | 14.6 |
| Water | 20.6 | 6.5 |
| Sodium hydroxide | 20.6 | 2.9 |
| Hydrogen chloride | 13.8 | 2.0 |
| Wash water |  | About 600 ml. |
| HCl and NaOH to adjust pH |  |  |
| Products: |  |  |
| Pentachlorophenol | 45.0 | 0.97 |
| DMSO | 199.6 | 14.6 |
| Sodium chloride | 39.0 | 3.8 |
| Water |  | About 500 ml. |

As will be seen from the equations set forth under Reaction I, two moles of caustic are theoretically used for each mole of hexachlorobenzene. As a practical matter, an excess of such caustic must be employed for effective results, the excess in these specific examples as set forth above having been 0.9 mole over the theoretical 2:1 ratio.

In connection with the caustic, while sodium hydroxide has been specifically illustrated in the specific examples set forth above primarily because it is inexpensive, effective, readily available and because it forms a by-product (sodium chloride) which is insoluble in the DMSO (or other sulfoxide reaction media of the present invention) and which, accordingly, may be readily removed therefrom, other hydrolysis agents may be used. For example, the alkaline hydrolysis agent may be the hydroxide of the other alkaline metals, such as lithium, potassium, rubidium or cesium; hydroxides of the alkaline earth metals, such as calcium, strontium or barium; organic bases; the carbonates of, for example, alkaline metals such as sodium or potassium; the triple salt $NaOH \cdot Na_2SO_4 \cdot NaCl$; etc. As will be apparent, there is a wide flexibility in the particular hydrolysis agent which may be employed.

While HCl was suggested as the acidifying medium in Stage II of the process described above, other media may be used in lieu thereof providing they can supply hydrogen ions to the chlorobenzene salt and, preferably, providing they can form a salt with the cation of the hydrolyzing agent which is insoluble in the reaction medium. Sulfuric acid is a good example of a substitute for the HCl.

In the specific example previously discussed involving the hydrolysis of hexachlorobenzene to form pentachlorophenol, aqueous sodium hydroxide was added to the heated slurry of hexachlorobenzene and DMSO, the molar ratio of water to sodium hydroxide being slightly greater than 2.2/1. It is necessary to add water to the sodium hydroxide since the sodium hydroxide is not soluble to any great extent in the DMSO, whereas sufficiently aqueous sodium hydroxide has substantially increased solubility in DMSO. Lowering the ratio of water to sodium hydroxide to too great an extent will not produce most effective results. For example, a too low ratio may impart a dark red color to the reaction slurry when the sodium hydroxide is added to the slurry and produce a gritty pentachlorophenol in lower yield (i.e., possibly 95%) and with the darkest color (brown). As previously indicated, however, the water/sodium hydroxide may be increased without adverse effects on the process, though the boiling temperature will be lowered and the reaction time lengthened.

As will be noted in the specific example previously set forth, the molar ratio of DMSO to hexachlorobenzene was approximately 15/1. As a practical matter, a sufficient sulfoxide/chlorinated material reactant ratio should be maintained to provide a sufficiently dilute slurry to permit its ready agitation before hydrolysis and after precipitation of the pentachlorophenol. An insufficient quantity of sulfoxide may prevent the reaction from going to completion, as well, although the proper quantity of sulfoxide can readily be determined by one skilled in the art for given reactants and need not cause any difficulty in conducting the process of the present invention.

In addition, when the proper proportions of materials are used, the solution following the hydrolysis reaction will be clear, as will the sides of the reaction vessel. Where the reaction is incomplete due to an insufficient quantity of sulfoxide, sublimed hexachlorobenzene may appear on the top edges of the reaction vessel.

As will be apparent from the foregoing description, the conditions previously set forth for carrying out the hydrolysis of the present invention are generally applicable to all of the chlorinated compounds and reaction media which come within the purview of the instant application.

Note: As set forth in the drawing, "PCP" represents pentachlorophenol, "DMSO" represents dimethylsulfoxide and "HCB" represents hexachlorobenzene.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:
1. In a process of hydrolyzing hexachlorobenzene through the reaction of hexachlorobenzene with an aqueous alkaline hydrolyzing agent selected from alkali metal hydroxides, alkaline earth metal hydroxides, sodium carbonate, potassium carbonate and $NaOH \cdot Na_2SO_4 \cdot NaCl$, the improvement which comprises carrying out such hydrolysis in dimethylsulfoxide as the reaction medium.

2. In a process of hydrolyzing a chlorine substituted benzene by means of an aqueous alkaline hydrolyzing agent selected from alkali metal hydroxides, alkaline earth metal hydroxides, sodium carbonate, potassium carbonate and $NaOH \cdot Na_2SO_4 \cdot NaCl$, the improvement which comprises carrying out such hydrolysis in a reaction medium selected from the group consisting of (1) alkyl sulfoxides having the structure

wherein R is an alkyl group having 1 to 4 carbon atoms; (2) heterocyclic sulfoxides having the structural formula

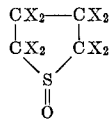

wherein X is a member of the group consisting of H and a lower alkyl group, not more than two X's being an alkyl group and the remainder being H; and (3) heterocyclic sulfoxides having the structural formula

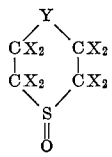

wherein Y is a member of the group consisting of S=O and $CX_2$ wherein X has the meaning hereinbefore given and not more than two X's are an alkyl group and the remainder are H.

3. A process as defined in claim 2 wherein the sulfoxide has the structure

wherein R is an alkyl group having 1 to 4 carbon atoms.

4. In a process of hydrolyzing a chlorine substituted benzene by means of an aqueous alkaline hydrolyzing agent selected from alkali metal hydroxides, alkaline earth metal hydroxides, sodium carbonate, potassium carbonate and $NaOH \cdot Na_2SO_4 \cdot NaCl$, the improvement which comprises carrying out such hydrolysis in dimethylsulfoxide as the reaction medium.

5. A process as defined in claim 4 wherein during said hydrolysis said compound to be hydrolyzed is converted to the corresponding salt of the hydrolysis agent employed.

6. In a process of hydrolyzing hexachlorobenzene through aqueous alkaline hydrolysis by means of an aqueous alkaline hydrolyzing agent selected from alkali metal hydroxides, alkaline earth metal hydroxides, sodium carbonate, potassium carbonate and $NaOH \cdot Na_2SO_4 \cdot NaCl$, the improvement comprising carrying out the hydrolysis in the presence of a reaction medium selected from the group consisting of (1) alkyl sulfoxides having the structure

wherein R is an alkyl group having 1 to 4 carbon atoms; (2) heterocyclic sulfoxides having the structural formula

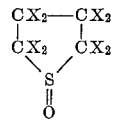

wherein X is a member of the group consisting of H and a lower alkyl group, not more than two X's being an alkyl group and the remainder being H; and (3) heterocyclic sulfoxides having the structural formula

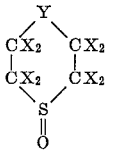

wherein Y is a member of the group consisting of S=O and $CX_2$ wherein X has the meaning hereinbefore given and not more than two X's are an alkyl group and the remainder are H.

7. A process as defined in claim 6 wherein the sulfoxide has the structure

wherein R is an alkyl group having 1 to 4 carbon atoms.

8. In a process of producing pentachlorophenol through the aqueous alkaline hydrolysis of hexachlorobenzene by means of an aqueous alkaline hydrolyzing agent selected from alkali metal hydroxides, alkaline earth metal hydroxides, sodium carbonate, potassium carbonate and $NaOH \cdot Na_2SO_4 \cdot NaCl$, the improvement comprising carrying out the hydrolysis in the presence of dimethylsulfoxide as the reaction medium.

9. A process as defined in claim 8 wherein said hydrolyzing agent is aqueous sodium hydroxide and wherein said sodium hydroxide is present in stoichiometric excess with respect to the quantity of hexachlorobenzene.

References Cited

UNITED STATES PATENTS

| | | | |
|---|---|---|---|
| 2,581,050 | 1/1952 | Smedslund | 260—607 |
| 2,870,215 | 1/1959 | Davis et al. | 260—607 |
| 2,872,461 | 2/1959 | Mattner | 260—623 |
| 3,023,183 | 2/1962 | Nelson | 260—607 |

BERNARD HELFIN, Primary Examiner

W. B. LONE, Assistant Examiner

U.S. Cl. X.R.

260—629, 640

FO-1050
(5/69)

UNITED STATES PATENT OFFICE
CERTIFICATE OF CORRECTION

Patent No. 3,481,991      Dated December 2, 1969

Inventor(s) Robert Seldon Cohen

It is certified that error appears in the above-identified patent and that said Letters Patent are hereby corrected as shown below:

Column 2, line 63, change "compuonds" to --compounds--.

Column 3, line 21, after "hydrolyzing" insert --hexachloroben: to pentachlorophenol involving the--;
line 29, before "chloride" (second occurrence), insert --sodium--;
line 30, after "removing" insert --the--;
line 68, change "pound" to --compound--.

Column 4, line 8, before "alkyl" insert --an--.

Column 5, line 48, change "1" to --(1)--.

Column 6, line 17, change "4" to --(4)--;
line 45, change "6" to --(6)--;
line 47, change "3" to --(3)--;
line 48, change "8" to --(8)--;
line 70, change "7" to --(7)--;
line 71, change "12" to --(12)--;
line 73, change "14" to --(14)--.

Column 7, line 4, change "16" to --(16)--;
line 4, change "17" to --(17)--;
line 11, change "14" to --(14)--;
line 27, change "19" to --(19)--;
line 28, change "17" to --(17)--;
line 30, change "20" to --(20)--;
line ..,  change "17" to --(17)--;
line 31, change "21" to --(21)--.

Signed and sealed this 30th day of June 1970.

(SEAL)
Attest:

EDWARD M. FLETCHER, JR.      WILLIAM E. SCHUYLER, JR.
Attesting Officer             Commissioner of Patents